United States Patent [19]

Randall et al.

[11] Patent Number: 4,940,040
[45] Date of Patent: Jul. 10, 1990

[54] ADJUSTABLE COOKING OVEN

[75] Inventors: James E. Randall; Ronald D. Lemke, both of Huron; Robert A. Mesteller, Toledo, all of Ohio

[73] Assignee: Stein, Inc., Sandusky, Ohio

[21] Appl. No.: 304,368

[22] Filed: Jan. 31, 1989

[51] Int. Cl.$^5$ ............................................. F24C 15/32
[52] U.S. Cl. ................................ 126/21 A; 126/41 R; 126/41 C; 99/443 C; 99/474; 99/377
[58] Field of Search ................ 126/21 A, 21 R, 41 R, 126/41 A, 41 B, 41 C; 34/28; 99/443 R, 467, 474, 443 C, 371, 377, 379

[56] References Cited

U.S. PATENT DOCUMENTS

| | | | |
|---|---|---|---|
| 2,593,233 | 4/1952 | White | 126/41 E |
| 4,462,383 | 7/1984 | Henke et al. | |
| 4,474,498 | 10/1984 | Smith | 99/443 C |
| 4,563,945 | 1/1986 | Hwang | |
| 4,567,819 | 2/1986 | Adamson | 99/443 C X |
| 4,701,340 | 10/1987 | Bratton et al. | 99/443 C X |
| 4,834,063 | 5/1989 | Hwang et al. | 126/21 A |

Primary Examiner—Larry Jones
Attorney, Agent, or Firm—Baldwin, Egan & Fetzer

[57] ABSTRACT

An adjustable oven for mass cooking of food products comprising an essentially sealed enclosure having a conveyor received therethrough for conveying food through the oven. A heated gaseous cooking medium is applied to the food product during conveyance through the oven by impingement of the cooking medium at high velocity through spaced duct fingers disposed above and below the conveyor system. The gaseous cooking medium is heated and circulated through the oven at high velocity and subsequently recirculated for continuous cooking of food products in the oven. The cooking oven enables optimization of the cooking process by allowing at least certain of the duct fingers to be vertically adjustable relative to the food product so as to maximize heat transfer therefrom for any particular food product. The elevation of the duct fingers from the food product may be continuously varied automatically during operation of the oven or during a cooking cycle giving the food processor great flexibility in use of the oven.

27 Claims, 8 Drawing Sheets

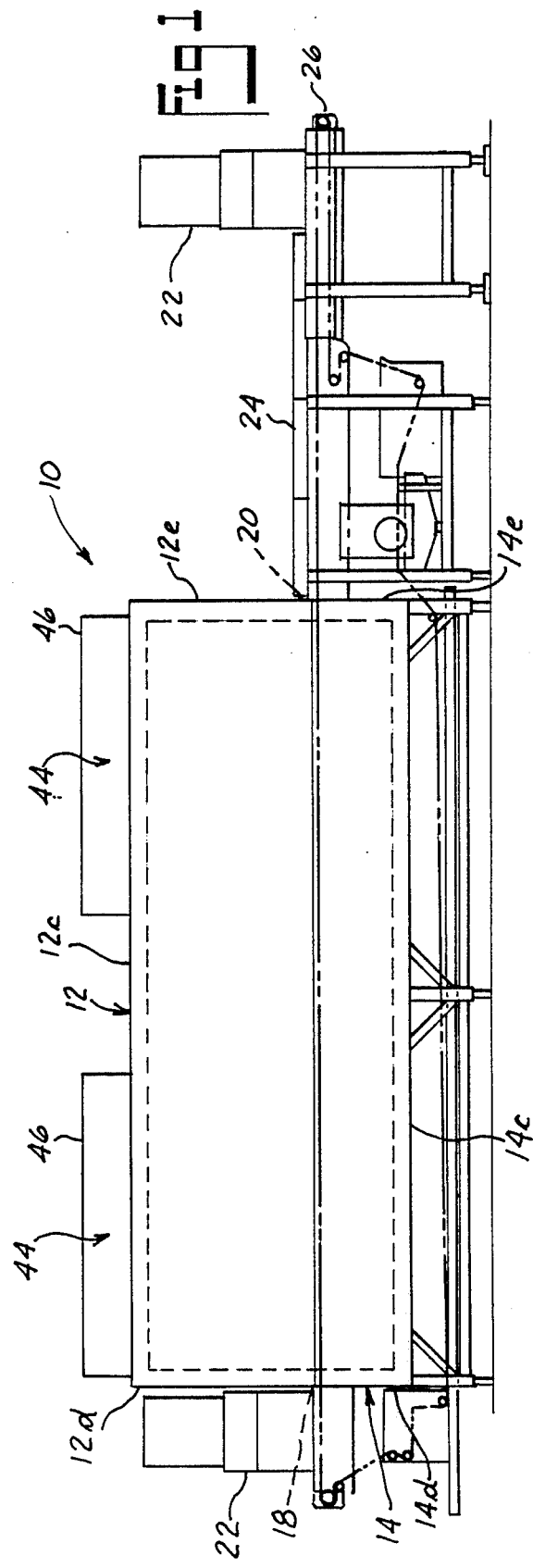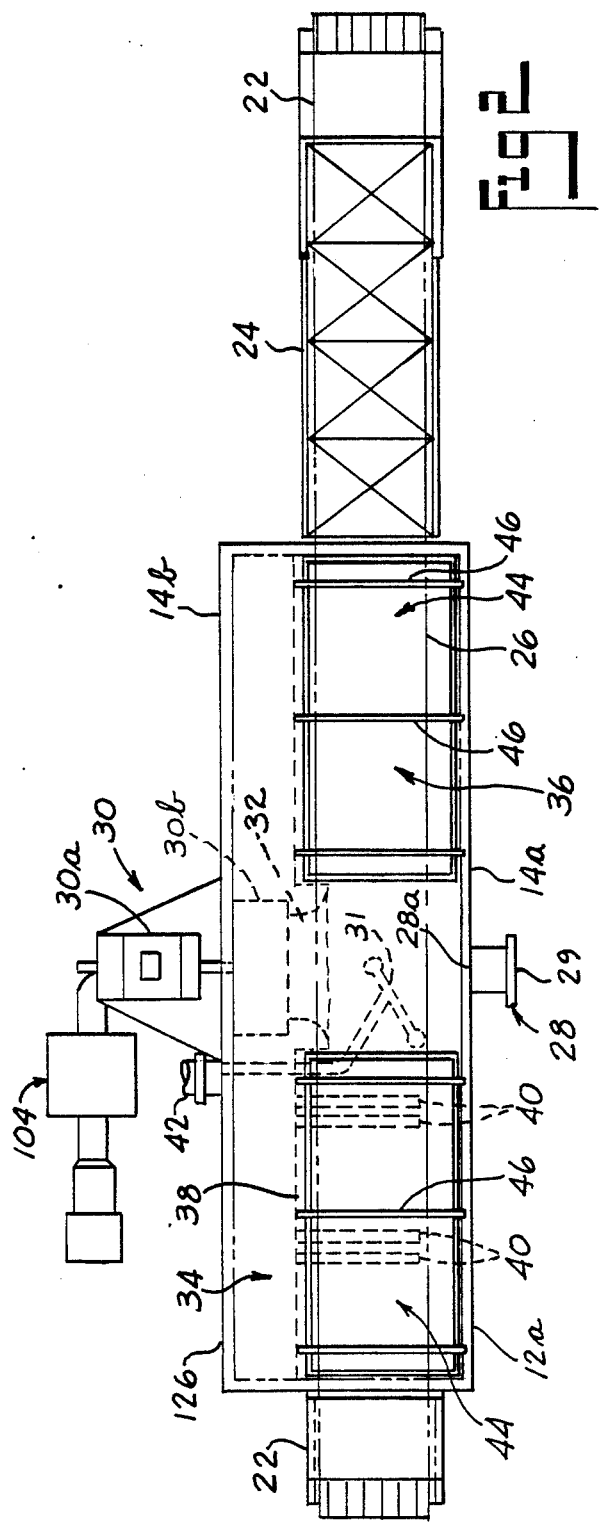

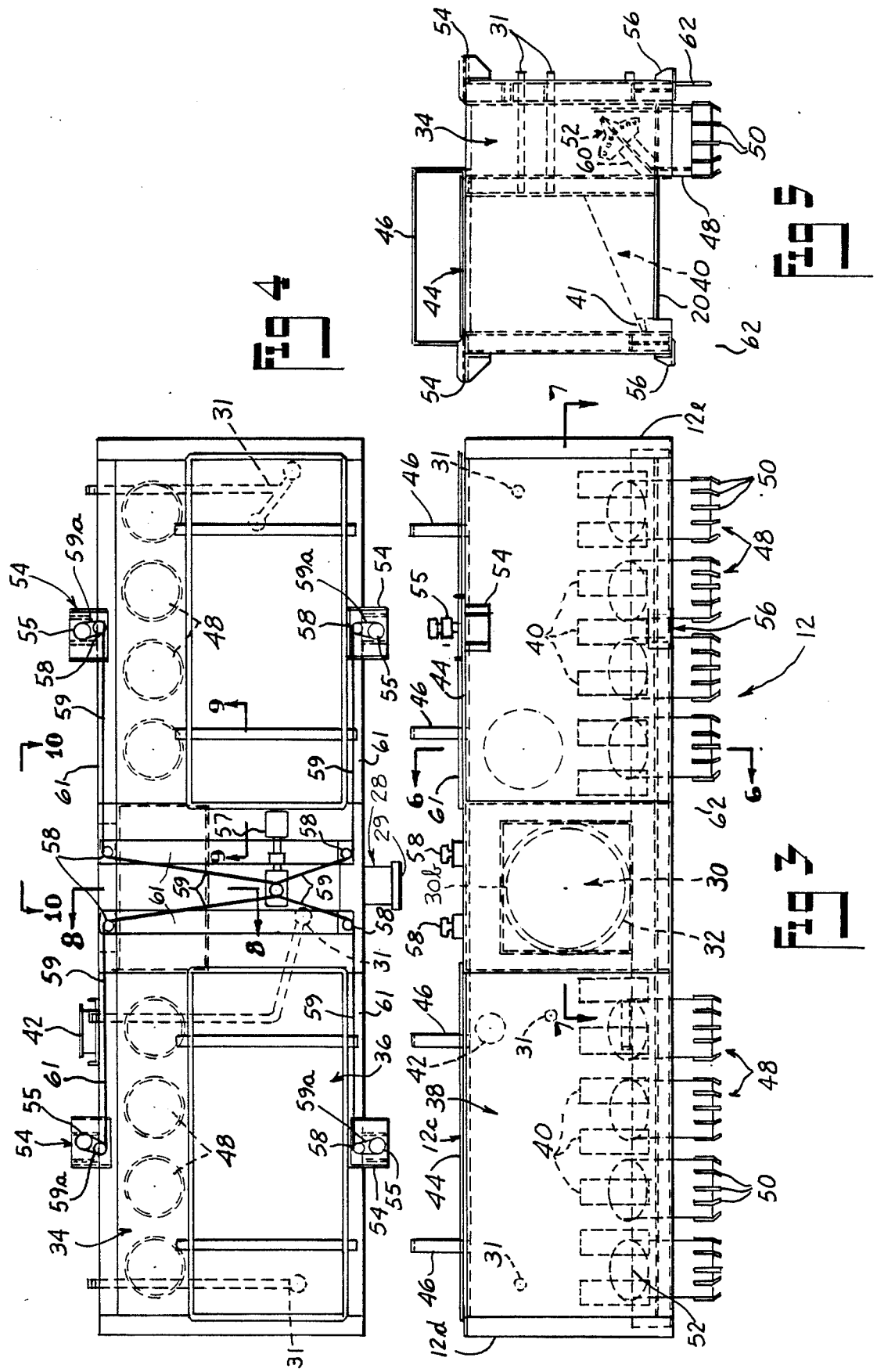

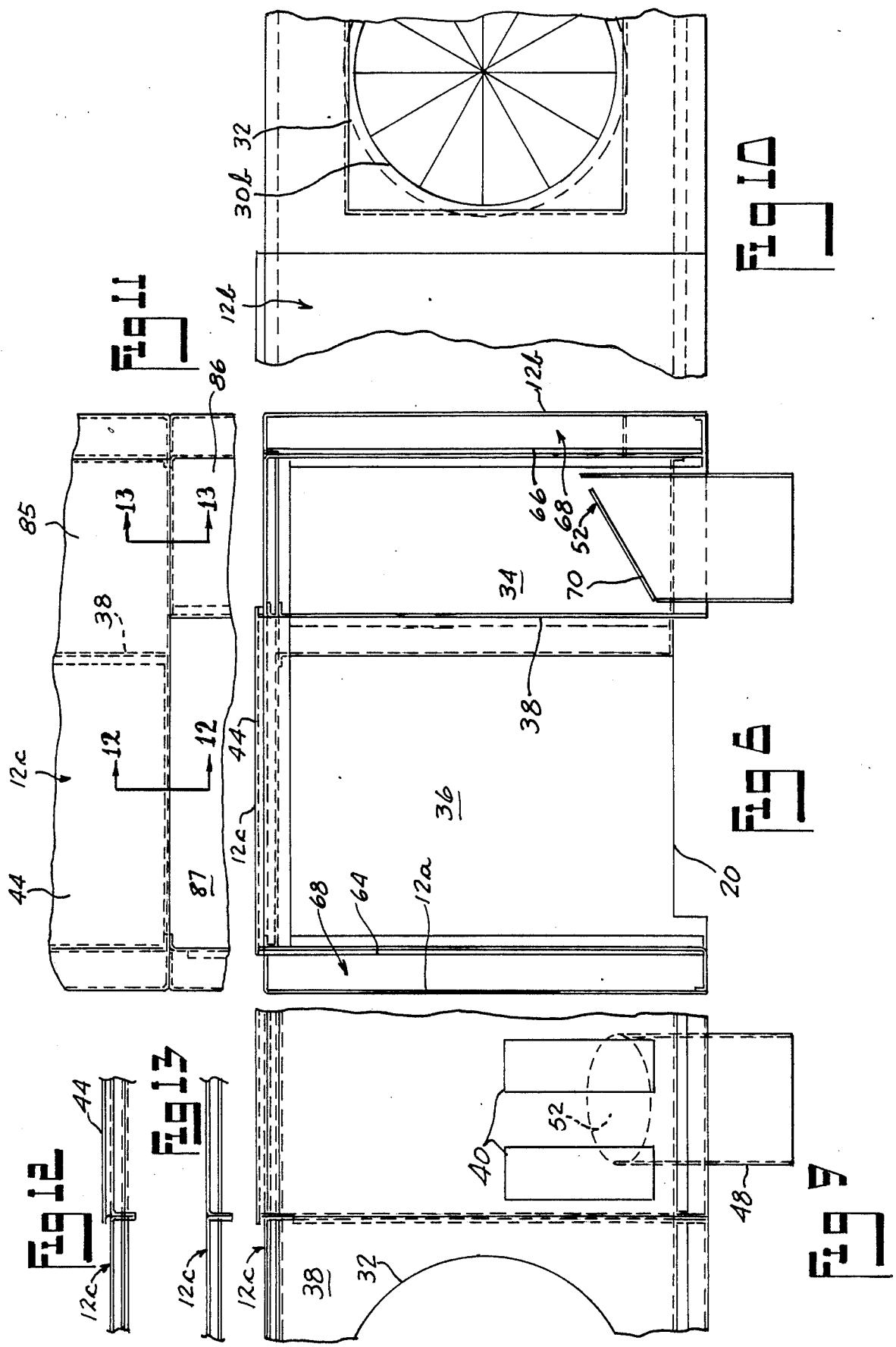

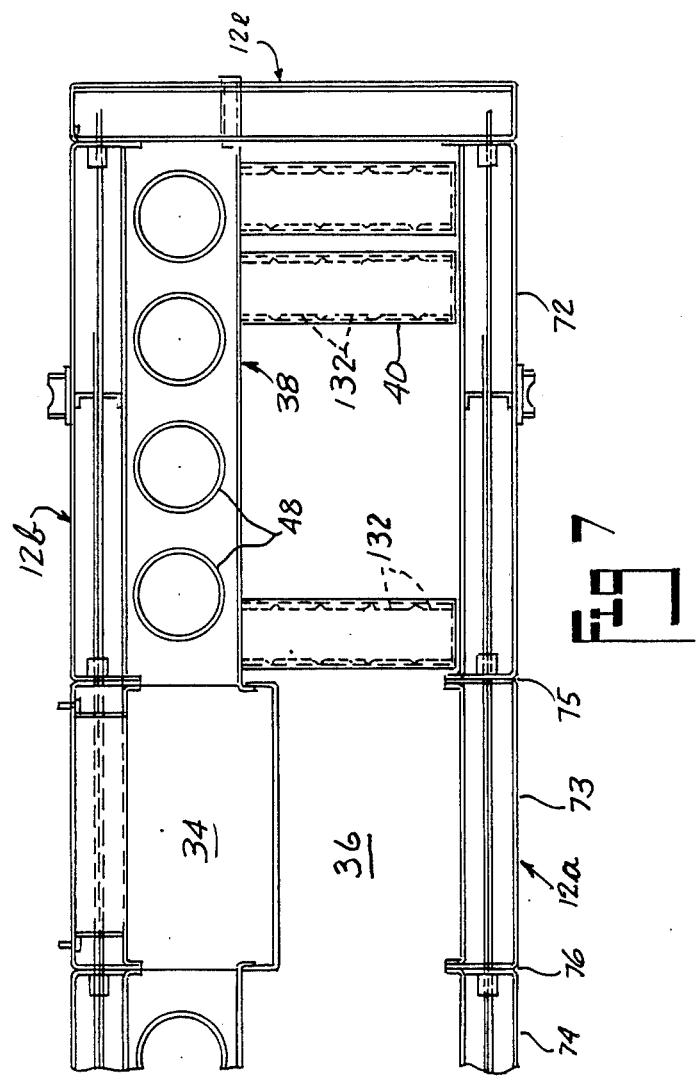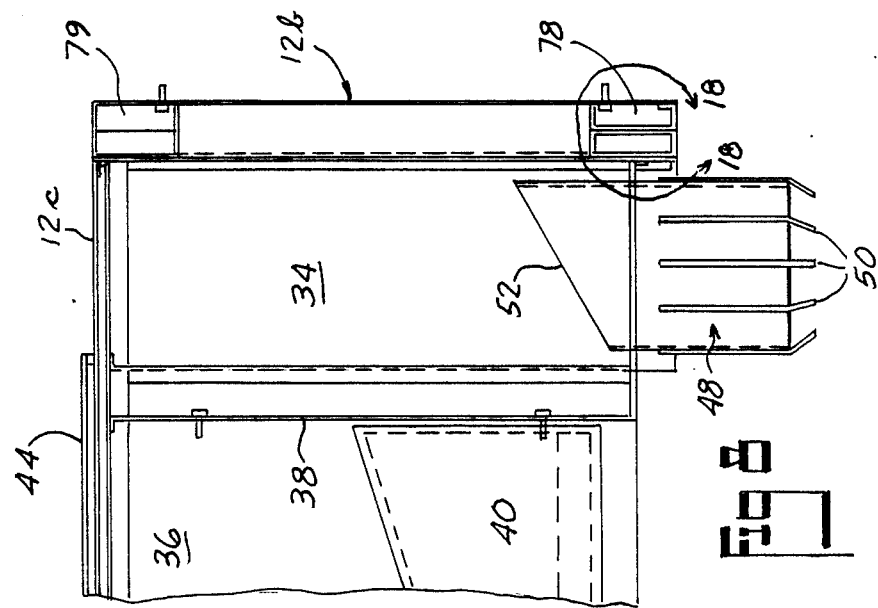

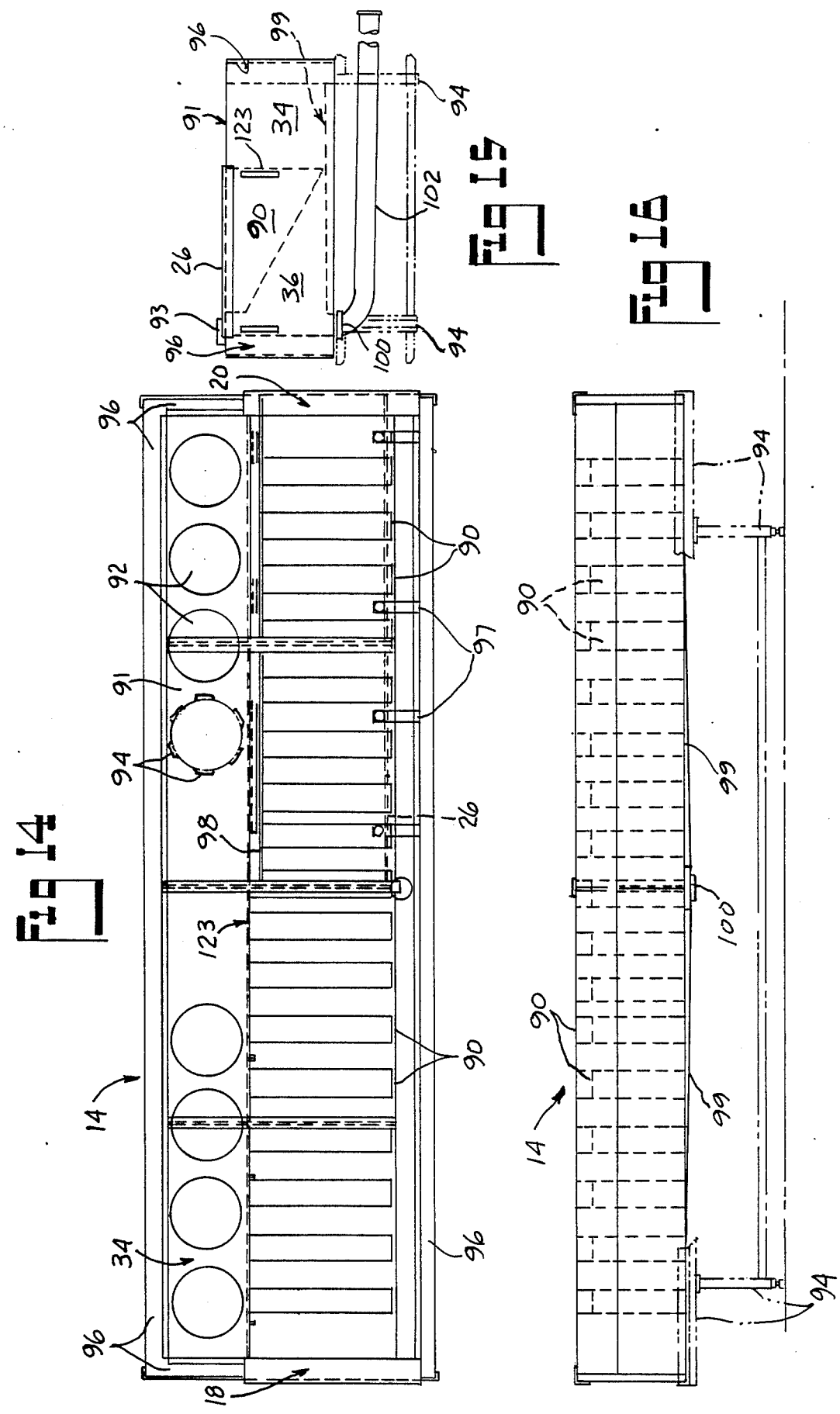

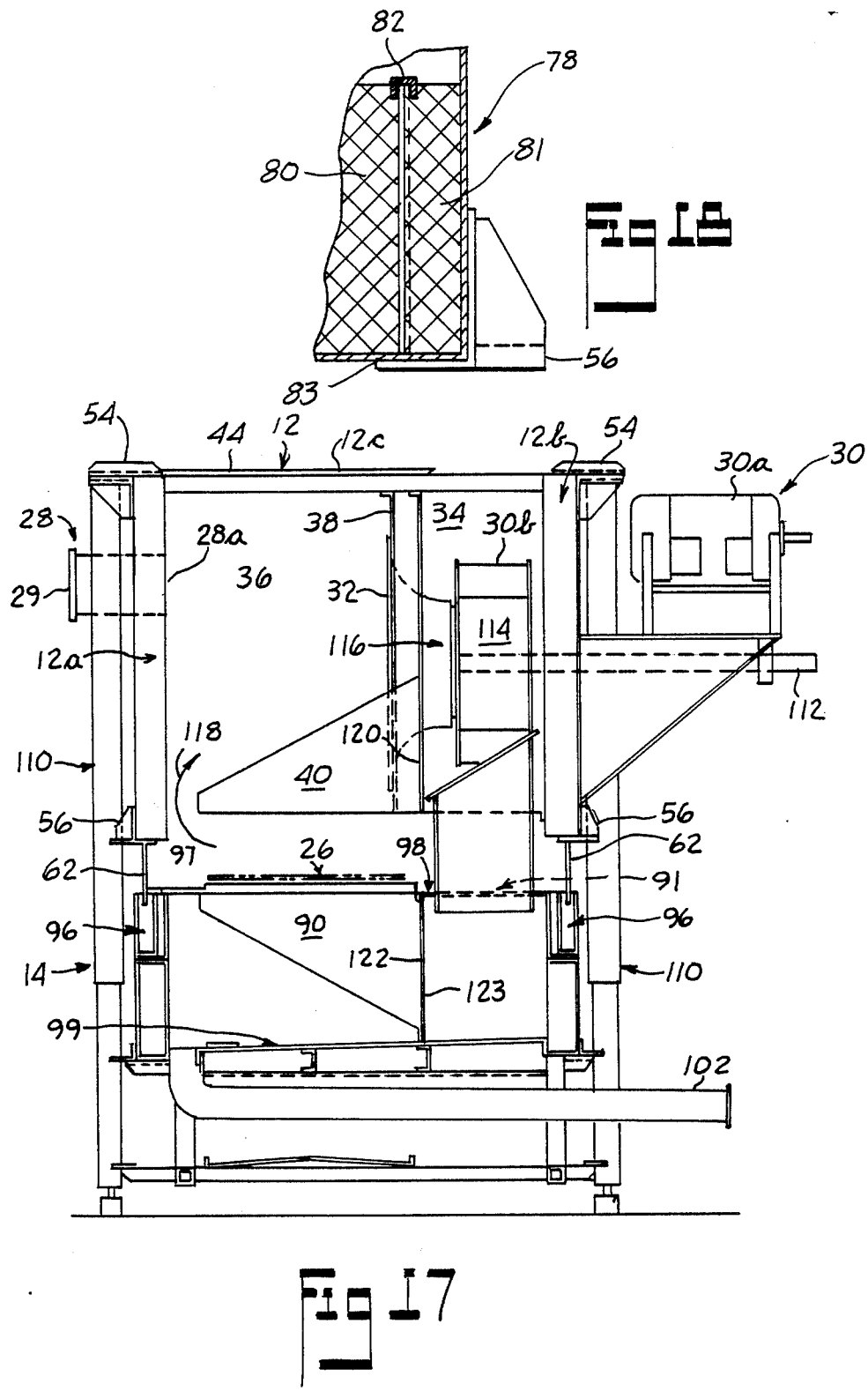

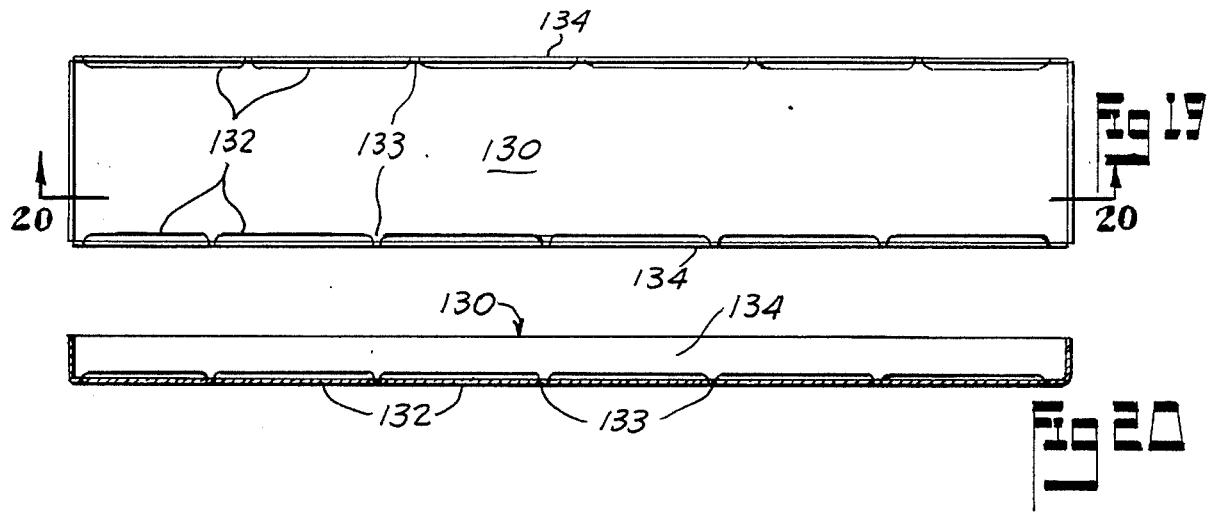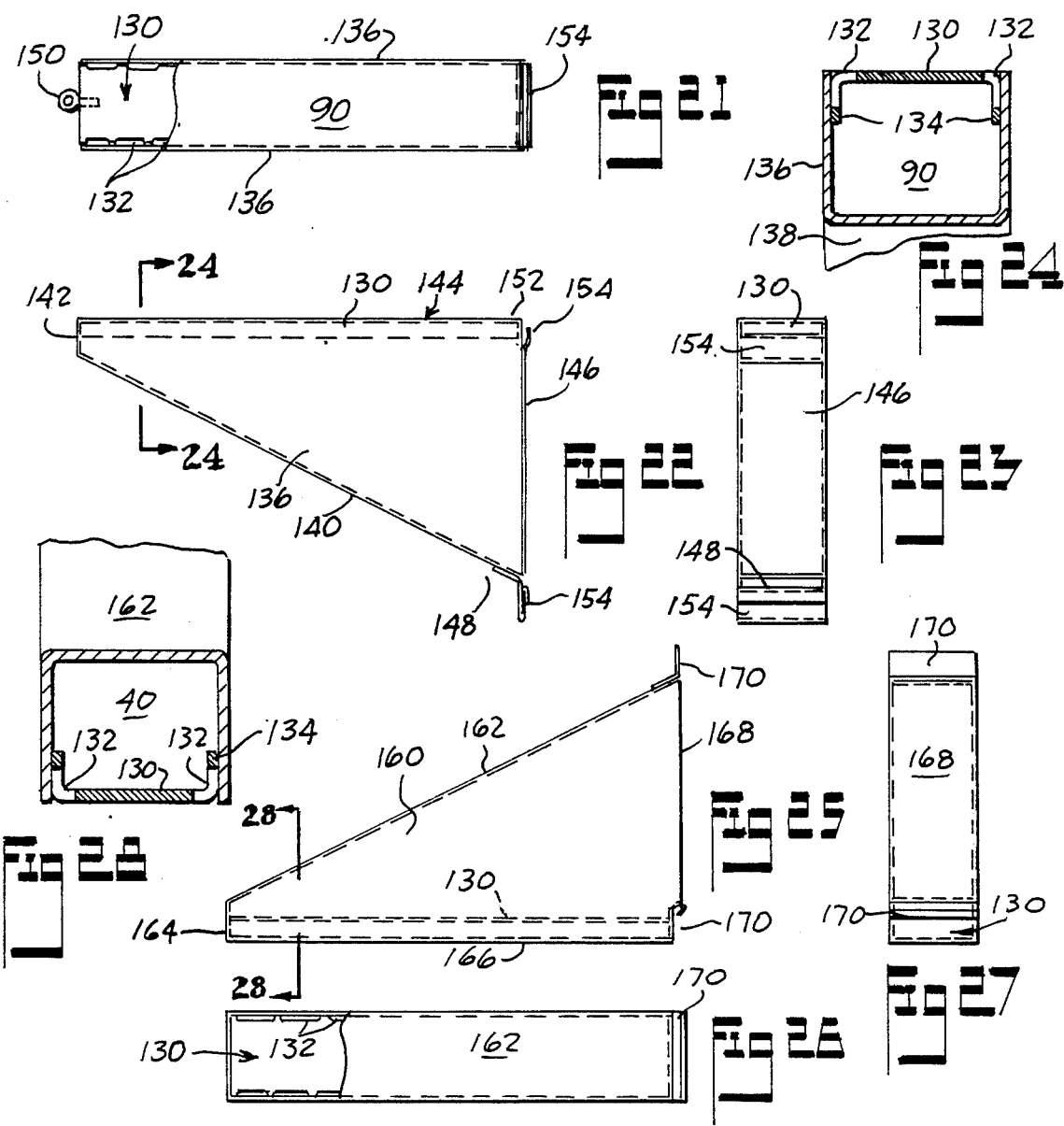

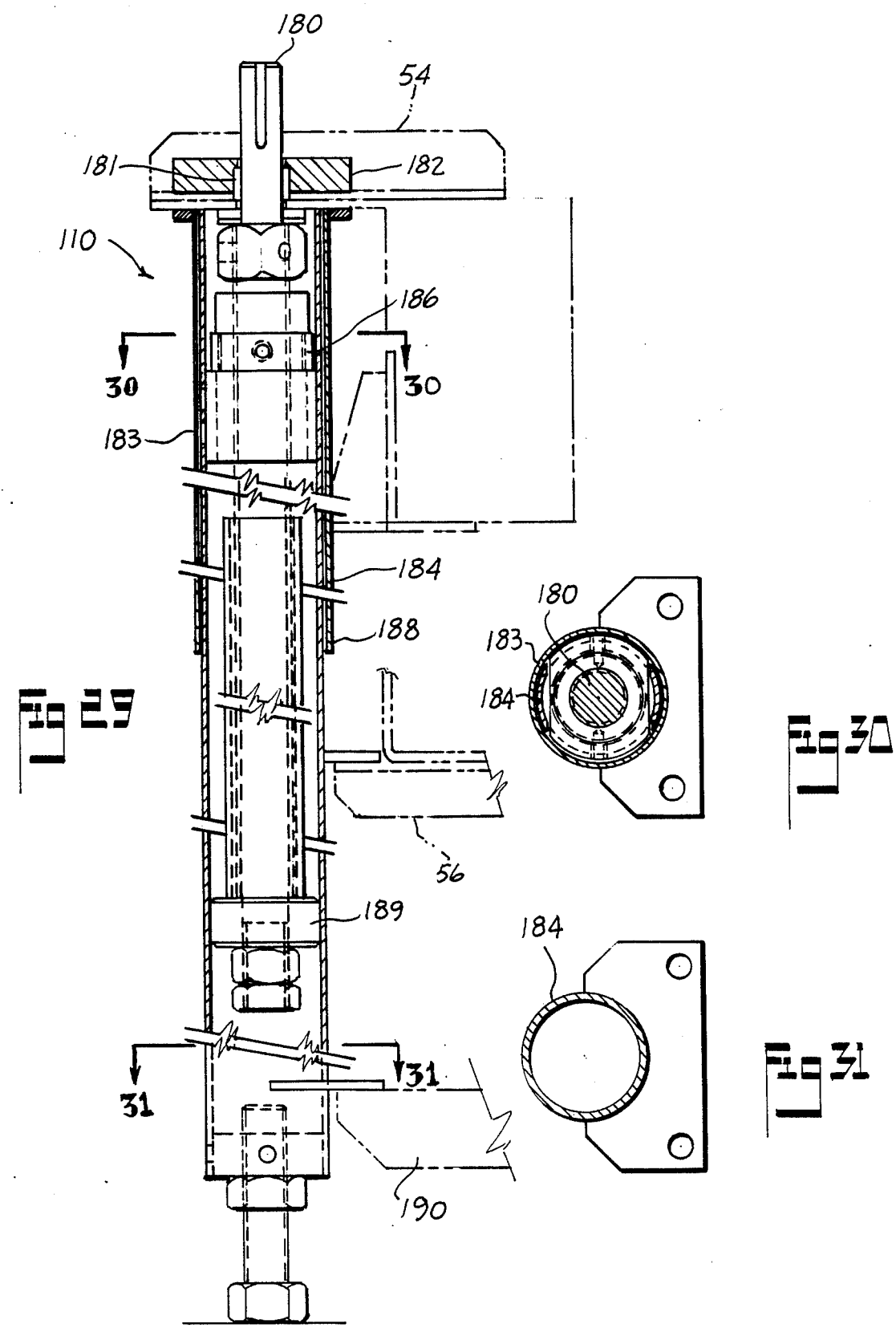

ADJUSTABLE COOKING OVEN

FIELD OF INVENTION

This invention relates generally to ovens and associated methods for mass cooking of food products or the like. More particularly, the invention is directed to an oven in which a heated gaseous cooking medium is applied to the food product while moved through the oven by a conveyor. The heated cooking medium is forced at a high velocity through spaced duct fingers which are disposed above and below the conveyor so as to direct a sheet of heated air over the food product. The gaseous cooking medium is heated and circulated through the oven at a high velocity through the duct fingers to perform the cooking operation. The cooking medium is then recirculated for reheating and distribution to the duct fingers in a repetitious fashion. The cooking oven enables optimization of the cooking process by allowing at least certain of the duct fingers to be vertically adjustable relative to the food product on the conveyor system. The distance between the duct fingers and the food product may be continuously varied automatically during a cooking cycle for various food products or different cooking characteristics.

BACKGROUND OF THE INVENTION

Cooking ovens utilized for mass cooking of food products are well known in the art. For this process, a continuous oven having a heated gaseous cooking medium comprising a mixture of steam and air is made to flow over the food product while the food product moves through the oven by means of a conveyor. The temperature of the gaseous cooking medium may be between approximately 250° F. and up to approximately 700° for full or partial cooking. It is of course desired to make the cooking process as rapid as possible while obtaining the desired degree of cooking, browning and moisture content in the food product being cooked.

One cooking oven, as disclosed in U.S. Pat. No. 4,563,945, discloses a "controlled atmosphere oven" which allows adjustability of temperature and the proportion of steam in the gaseous cooking medium to provide the desired cooking atmosphere for the particular food product and the degree of doneness desired by the food processor. In this cooking oven, the gaseous cooking medium being a mixture of air and steam is heated to a high temperature and thereafter forced through a cooking chamber for cooking of a food product in the chamber.

The gaseous cooking medium is subsequently recirculated for reheating and circulation back into cooking chamber. The cooking oven comprises a movable hood which forms the upper portion of the enclosed cooking chamber of the oven. The hood portion can be raised from the base portion of the oven for cleaning interior surfaces of the oven quickly and efficiently so as not to inhibit rapid cooking of mass quantities of various food products. In this oven, the gaseous cooking medium is directed into the cooking chamber at a central location such that the gaseous cooking medium is made to flow over the food product in a direction opposed to the direction of conveyance or counterflow in a portion of the chamber. The counterflow helps reduce the cooking time as desired and also yields an efficient circulation configuration.

It should be recognized that the continuous flow oven shown in this patent enables the rapid cooking of mass quantities of food product but also requires high temperatures and atmospheric control or alternatively longer cooking times to obtain the desired browning of the outer surface of the food product as well as the degree of doneness or moistness sought by the food processor. In some situations, the continuous flow oven is not capable of optimally cooking the food product with the characteristics desired by the food processor. For example, by directing the heated cooking medium into the cooking chamber at a central location from which the cooking medium flows toward the ends of the oven, the portion of the conveyor system near the central location will necessarily receive higher temperatures than that portion near the ends of the oven as the cooking medium cools. In this construction of an oven, there may exist a temperature differential across the length of the conveyor of up to 80° F.

Another problem associated with the continuous flow oven as disclosed lies in that the hood member subjected to the stress of thermal expansion during use of the oven which must be compensated for while maintaining separability of the hood member in relation to the bottom portion of the oven. The offsetting characteristics of strength and flexibility to allow thermal expansion of the hood member may result in the loss of thermal expansion capabilities on behalf of strengthening the hood member so as to not collapse under its own weight.

Another oven known in the prior art is shown in U.S. Pat. No. 4,834,063 which discloses an oven utilizing the impingement of a heated gaseous cooking medium on to the food product to more quickly and efficiently obtain the desired browning and/or crisping of the surface of the food product as well as achieve faster cooking times. In this type of oven, the temperature differential problem associated with the continuous flow oven previously described is alleviated as the air flow is across the conveyor belt rather than parallel to it. This oven also continuously circulates the gaseous cooking medium and allows the addition of moisture thereto for obtaining the desired characteristics of doneness and moistness. The cooking oven comprises impingement duct fingers for directing jet streams of the moisturized cooking medium onto a food product being conveyed through the oven. The gaseous cooking medium is heated and directed at a relatively high velocity to the duct fingers for impingement on the food product and is subsequently recirculated for repeating this cycle.

It should be recognized that as the distance between the duct fingers and food product increases, the heat transfer characteristics of the jet stream will be decreased necessitating longer dwell time in the oven for proper cooking of the food product. Similarly, the browning of the food product cannot be effectively and optimally achieved as the distance between the duct finger and food product increases. Although the structure of the cooking oven as shown in this application allows adjustment of upper duct fingers for optimum cooking of a particular food product, such adjustment cannot be made during operation of the oven, and the flexibility of using the oven to cook various food products in one cooking cycle is inhibited. Further, adjustment of the duct fingers is somewhat inconvenient and time consuming thereby limiting the use of such a feature in mass preparation of various food products. Other ovens utilizing impingement of a heated cooking medium may be found for example in U.S. Pat. No. 4,462,383.

It is also found in this type of oven that cleaning of all interior surfaces is somewhat inhibited due to the necessity of providing a supporting structure for the duct fingers which are disposed above the food product within the oven. The structure as disclosed in the above application comprises a plurality of access doors to the interior of the oven for maintenance and cleaning thereof. Although the access doors are provided for gaining entrance to the oven's interior, not all surfaces which need to be cleaned are accessible. To facilitate further cleaning of the oven, a mixture of steam and heated water is fed into the oven via the cooking medium moisturizing system for cleaning of surfaces in the vicinity thereof. Also, drippings from the food product or the like are continuously drained outwardly of the oven to reduce the necessary cleaning of the ovens interior. The cleaning procedures in combination allow for adequate cleaning of the oven but are somewhat time consuming and add costs to the oven.

Another problem associated with this type of oven is found in that any access doors must necessarily be sealed to prevent the egress of the gaseous cooking medium from within the oven. The sealing structure has presented a significant problem and results in additional costs in the manufacture of the oven.

It is also noted that the oven as shown in this application positions the heating and blowing means for circulation of the gaseous cooking medium at the top of the oven to enable circulation to the lower duct fingers of the apparatus. In this way, the height of the oven may present a problem to the food processor.

SUMMARY OF THE INVENTION

In view of the prior art, there has been a need to provide a convection cooking oven which allows for large scale production of cooked food products in a manner that optimizes cooking of various products during one cooking cycle. In this respect, it is also desired to provide a convection cooking oven which allows the food processor to obtain desired characteristics such as browning of the food products, maintaining a degree of moistness within the food product, and allowing various degrees of cooking to be accomplished both quickly, efficiently and economically.

Accordingly, an object of the invention is to provide a novel oven for cooking food products which efficiently utilizes the convection cooking process in conjunction with impingement type duct fingers which allow for the desired cooking characteristics and the efficient mass cooking of food products.

It is a further object of the invention to provide an oven which allows for impingement of a heated gaseous cooking medium onto food products passing through the oven wherein the gaseous cooking medium is directed onto the food products at a very high velocity as a sheet of the gaseous cooking medium.

It is yet another object of the invention to provide an oven wherein moisture may be expeditiously mixed with the heated cooking medium such that application of the cooking medium by the impingement process results in an adequate moisturization of the various kinds of food products as desired by the food processor and allows for improved cooking thereof.

Still another object of the invention is to provide an oven wherein impingement of the gaseous cooking medium is applied to the food product by impingement duct fingers positioned above and below the food product such that even cooking of the food products may be accomplished both very rapidly and economically.

Another object of the invention is to provide an oven wherein the oven can be effectively and rapidly cleaned and wherein drippings from the food product are continuously urged or drained outwardly of the oven.

It is yet another object of the invention to provide an oven wherein impingement of the heated gaseous cooking medium through duct fingers positioned above and below the food product may be optimized for maximum heat transfer from the cooking medium to the food product by allowing selective vertical adjustment of the duct fingers relative to the food product such that the distance between the sheets of high velocity cooking medium flowing from the duct fingers onto the food product can be selectively varied by the food processor for various food products even during use of the oven or within a cooking cycle.

It is yet another object of the invention to provide an oven which includes a raisable hood portion which may be conveniently raised for optimum cooking of a particular food product or for cleaning of the interior surfaces of the oven, and which still enables directing of the heated gaseous cooking medium to lower duct fingers positioned beneath the food product as well as being sufficiently strong and at yet flexible to allow for thermal expansion thereof.

Another object of the invention is to provide a novel method for large scale production of cooked food products.

These and other objects may be accomplished by a convection cooking oven which utilizes a plurality of spaced impingement type duct fingers disposed above and below a conveyor mechanism which transports a food product through the oven. The duct fingers allow the application of a heated gaseous cooking medium to the food product on the conveyor at a very high velocity for rapid and efficient cooking of the food product as well as providing desired characteristics to the cooked product. The oven includes a heater means which is provided on a side portion of the oven enclosure and extends into the cooking chamber for supplying a heated gaseous cooking medium for circulation through the cooking chamber for the cooking operation. A moisture supplying means may be positioned within the path of the heated gaseous cooking medium which is circulated into the cooking chamber so that moisture can be incorporated into the cooking medium to maintain the moisture content of a food product as is desired in some cooking operations. A fan means may be disposed near the heater means for circulating the heated gaseous cooking medium to the upper and lower disposed duct fingers for directing the cooking medium onto the food products and subsequently for drawing the moisturized cooking medium upwardly out of the cooking chamber for reheating and recirculation thereof. The fan means is positioned such that the pressure side of the fans is disposed in a separate chamber from the cooking chamber wherein moisture may be incorporated in the heated gaseous cooking medium and then directed to the duct fingers at high pressure for the impingement thereof onto food products disposed on a conveyor running intermediate the upper and lower duct fingers.

The oven comprises an upper hood portion which includes the heater means and the upper duct fingers as well as the fan means and moisture supplying means as described. A lower or base portion of the oven includes the lower duct fingers, the conveyor system as well as means for permitting drippings falling down from the conveyor to flow out of the oven. The hood portion in conjunction with the base portion forms the cooking chamber in which a food product will be transported by the conveyor system for the cooking thereof. The hood portion is selectively raisable to adjustably vary the elevation of the upper duct fingers from the food product during the cooking operation, or selectively raised to completely disengage from the lower base portion for convenient and effective cleaning of the interior surfaces of the oven.

The hood portion includes duct tubes which coact with an orifice plate in the base portion of the oven so as to direct the heated gaseous cooking medium to the lower disposed duct fingers at high pressure for impingement onto the food product therefrom. The duct tubes are constructed so as to telescope into the orifice plate for allowing vertical adjustment thereof while maintaining the supply of high pressure cooking medium to the lower disposed duct fingers. The configuration of the oven results in an efficient convection type cooking oven for mass cooking of food products which allows for optimization of the cooking process and is especially readily cleanable.

BRIEF DESCRIPTION OF THE DRAWINGS

These and other objects along with the advantages of the present invention will be readily apparent by reference to the following detailed description when considered in conjunction with the accompanying drawings, wherein:

FIG. 1 is a side elevational view of the convection type food cooking oven embodying the invention;

FIG. 2 is a top plan view of the oven as shown in FIG. 1;

FIG. 3 is an enlarged side elevational view of the hood assembly of the oven as shown in FIG. 1, and illustrating the position of the upper disposed duct fingers in the interior of the oven in relation to the fan means which circulates the heated gaseous cooking medium from the heater means to the duct fingers for impingement upon the food product, as well as the duct tubes enabling supply of the cooking medium to the base portion and lower disposed duct fingers;

FIG. 4 is an enlarged top plan view of the hood portion as shown in FIG. 3 including the moisturizing means and the means by which the hood assembly may be selectively raised;

FIG. 5 is an enlarged side elevational view of the hood portion as shown in FIG.3 showing more particularly the position of the upper disposed duct fingers and duct tubes associated with the hood portion;

FIG. 6 is a partially broken, generally diagrammatic enlarged sectional view taken in general along the plane of line 6—6 of FIG. 3, and illustrating more particularly the construction of the hood portion including the flame tube associated with the heater means as well as a damping structure associated with the duct tubes therein;

FIG. 7 is a partially broken, generally diagrammatic enlarged sectional view taken in general along the plane of line 7—7 of FIG.3, and illustrating more particularly the construction of the hood assembly including joints giving the hood portion flexibility for accommodating thermal expansion;

FIG.8 is a partially broken, generally diagrammatic enlarged sectional view taken in general along the plane of line 8—8 of FIG. 4, and illustrating the unique support system for the hood assembly enabling thermal expansion and retaining sufficient strength therein;

FIG. 9 is partially broken, generally diagrammatic enlarged sectional view taken in general along the plane of line 9—9 of FIG. 4, and illustrating more particularly the relative positions of the upper disposed duct fingers, the duct tubes as well as the flame tube and high pressure plenum in which the high pressure heated gaseous cooking medium is circulated;

FIG. 10 is a partially, broken, generally diagrammatic enlarged sectional view taken in general along the plane of line 10—10 of FIG. 4, and illustrating the heater means including the flame tube in more detail;

FIG. 11 is a partially broken, generally diagrammatic enlarged sectional view of a portion of the roof construction on the hood portion as shown in FIG. 3 showing in more detail the sectional structure of the hood portion allowing for thermal expansion;

FIG. 12 is a partially broken, generally diagrammatic enlarged sectional view taken in general along the plane of line 12—12 of FIG. 11, and illustrating the outer skin configuration at the roof of the hood portion;

FIG. 13 is an enlarged sectional view generally similar to FIG. 12 taken generally along the plane of line 13—13 of FIG. 11;

FIG. 14 is a generally diagrammatic top plan view of the base portion of the oven as shown in FIG. 1 illustrating the lower disposed duct fingers and orifice plates which coact with the duct tubes forming a part of the hood portion of the oven;

FIG. 15 is a generally diagrammatic enlarged side elevational view of the base portion as shown in FIG. 14;

FIG. 16 is a front elevational view of the base portion of the oven as shown in FIG. 14;

FIG. 17 is a generally diagrammatic and enlarged side elevational view of the oven as shown in FIG. 1 showing more particularly the hood portion and base portions thereof in working relationship to one another so as to provide the cooking chamber of the oven;

FIG. 18 is a partially broken, generally diagrammatic enlarged sectional view taken in general along the plane of line 18 in FIG. 8, and illustrating the novel support structure for the hood portion of the oven allowing thermal expansion thereof;

FIG. 19 is an enlarged top plan view of a jet plate associated with the upper and lower duct fingers allowing for impingement of high velocity curtains of cooking medium onto a food product;

FIG. 20 is an enlarged sectional view taken in general along the plane of line 20-20 of FIG. 19 showing the jet plate of the duct fingers;

FIG. 21 is a partially broken bottom plan view of a lower disposed duct finger associated with the base portion of the oven;

FIG. 22 is a side elevational view of the lower disposed duct finger as shown in FIG. 21;

FIG. 23 is a front elevational view of the lower disposed duct finger as shown in FIG. 1;

FIG. 24 is a sectional view taken in general along the plane of line 24—24 of FIG. 22 showing the relationship of the jet plate with the lower disposed duct finger;

FIG. 25 is a side elevational view of an upper disposed duct finger associated with the hood portion of the oven;

FIG. 26 is a partially broken top plan view of the upper disposed duct finger as shown in FIG. 25;

FIG. 27 is a front plan view of the upper disposed duct finger as shown in FIG. 25;

FIG. 28 is a sectional view taken in general along the plane of line 28—28 of FIG. 25 showing the upper disposed duct finger including jet plate associated therewith;

FIG. 29 is a partially broken partial sectional view of a jack screw associated with the lift mechanism of the oven;

FIG. 30 is a sectional view taken in general along the plane of 30—30 of FIG. 29; and FIG. 31 is a sectional view taken in general along the plane of 31—31 of FIG. 29.

DETAILED DESCRIPTION OF THE INVENTION

Referring now to the drawings, a preferred embodiment of the oven 10 as shown in FIG. 1 comprises an enclosure assembly formed of an upper hood assembly 12 having side walls 12a and 12b, top wall 12c and end walls 12d and 12e. The walls of the upper hood portion 12 comprise an outer and inner skin to essentially form a double wall construction wherein an insulating material 16 will be disposed therebetween. The end walls 12d and 12e each have an inlet opening 18 and outlet opening 20 respectively therein, through which food products are introduced into and removed from the oven. The openings 18 and 20 allow various food products which may be flat or have substantial bulk to be introduced into the oven for cooking thereof on a conveyor means 26 for mass cooking of the food product. At the location of the inlet and outlet openings 18 and 20 there may be provided exhaust stack structures 22 of conventional known type along with an equilibration chamber 24 to help retain the heat within the oven and allow the cooked food products to adjust somewhat to atmospheric conditions upon removal from the oven.

The conveyor means 26 may be an endless pervious conveyor mechanism which extends through the oven from the inlet 18 thereof and passes out the outlet 20 in a continuous manner. The conveyor 26 may be powered in a conventional manner by means of a motor (preferably a hydraulic motor) and allows food products to be transported through the oven at the desired speed to achieve the cooking characteristics desired by the food processor. The hood portion 12 of oven 10 acts in conjunction with a lower base portion 14 of the oven enclosure to form the cooking chamber through which food product will pass during the cooking operation.

The base portion 14 includes side walls 14a, 14b, bottom wall 14c, and end walls 14d and 14e which in conjunction with the upper hood portion provide an essentially sealed vapor leak proof oven enclosure. As will be seen in more detail as the description proceeds, the upper hood portion 12 is selectively raisable from the lower base portion 14 for optimization of cooking of various food products within the oven as well as enabling access to the ovens interior for cleaning thereof.

A heating means 28 is mounted on a side wall 12a of the upper hood portion, and may include a known combination of gas blower and burner unit for supplying a heated gaseous cooking medium into the oven enclosure. The heating means 28 may generate gaseous medium having a temperature of 1600° F. or similar high temperatures. The heater 28 may be supported at the location of the side wall 12a by means of a stand off plate 29.

It is understood that the heating means may alternatively be positioned on side wall 12b of the upper hood portion 12 as is desired while still supplying the heated gaseous cooking medium for the oven. In this construction, a flame tube would extend across the high pressure plenum chamber so as to dispose the cooking medium into the cooking chamber. It is also noted that the positioning of the heater 28 on a side wall of the oven does not increase the height of the oven structure and will not impose any type of height limitations thereto. It is also noted that the heating means 28 directs the heated gaseous cooking medium to an outlet port 28a which is in relatively close relationship to a means for incorporating moisture into the cooking medium such as a source of moisture 31 which may constitute steam spray outlets for supplying predetermined amounts of moisture to the gaseous medium being furnished by the heater 28.

At a central location of the side wall portion 12b of upper hood 12 is disposed a large suction fan means 30 which may be driven by means of an electric motor 30a (as shown in FIG. 2) which is operatively coupled to the large impeller fan 30b which acts to circulate the gaseous cooking medium through the oven at high pressure. Coupled to the fan 30b is a blower cone 32 which connects to the cooking chamber 36 of the oven through a gap in the high pressure plenum 34 in relatively close relationship to the discharge duct port 28a of the heater 28. The blower cone 32 is relatively deep and allows a large amount of cooking medium to be directed to the fan means 30 for distribution to the duct fingers at a high velocity.

As the heater 28 generates and discharges the heated gaseous cooking medium at the discharge duct port 28a, the fan 30 will suck the heated gaseous cooking medium as well as moisture generated at means 31 into the blower cone 32 at the upper portion of the cooking chamber 36. The heated gaseous cooking medium is discharged into the high pressure plenum chamber 34 in the oven which is separated from the cooking chamber 36 as will be fully described later. The high pressure plenum chamber 34 is adapted to transfer the heated and moisturized cooking medium to the duct fingers which are disposed above and below the food product traveling through the oven on the conveyor means 26.

The high pressure plenum chamber 34 is separated from the cooking chamber 36 by means of a vertical dividing wall means 38 forming part of the upper hood assembly 12 as well as a similar divider in the base portion. The vertical dividing wall 38 may also act as the support for the upper disposed duct fingers 40 which are spaced relative to one another in the longitudinal direction of the oven as well as duct work for access to the high pressure plenum 34 comprising apertures in the wall 38. The upper disposed duct fingers 40 may be anchored at their distil ends to the front side wall 12a by means of finger supports 41 to ensure proper horizontal positioning thereof. An exhaust stack 42 may be positioned on the side wall 12b in communication with the high pressure plenum chamber 34 for venting the chamber 34 if desired. The exhaust stack 42 preferably embodies baffle means (not shown) for selectively restricting or preventing the ingress of gaseous medium to the stack 42 as is desired. The high pressure plenum chamber 34 may also be provided with baffle means to facilitate even distribution of the cooking medium.

There is also provided on top wall 12c of the upper hood assembly 12 explosion proof doors 44 and guards 46 which would allow the egress of the heated gaseous cooking medium from cooking chamber 36 upon the occurrence of an explosion or blowout within the oven. The explosion proof doors 44 are provided with a sealing means on their periphery so as to seal tightly against the top wall 12c due to the weight of the doors themselves. The doors 44 will not interfere with the function of the oven except in the event of an explosion or the like.

Referring now to FIGS. 3, 4 and 5, the upper hood assembly 12 of the oven is shown in more detail. As mentioned previously, the upper hood assembly 12 may be selectively raised from the lower base portion 14 of the oven for optimization of the cooking process or for gaining access to the interior of the oven for cleaning or maintenance thereof. The upper hood assembly 12 includes fan means 30 having fan 30b and blower cone 32 mounted on the back side wall 12b of the hood 12.

As more distinctly seen in FIG. 3, the upper hood assembly 12 also includes upper disposed duct fingers 40 which are evenly spaced along the longitudinal direction of the oven which will be positioned directly above the conveyor means supported in the base portion of the oven as seen in FIG. 1. As mentioned previously, the upper hood assembly has a high pressure plenum chamber 34 and a cooking chamber 36 which are separated in the hood 12 by a dividing wall 38 extending in the vertical direction. The upper disposed duct fingers 40 are positioned in the cooking chamber and may be releasably supported on the dividing wall 38 in conjunction with apertures or duct work therein to properly position the fingers for cooking.

The upper hood assembly 12 also comprises duct tubes 48 which extend from the bottom edge of the hood assembly 12 to allow the heated gaseous cooking medium generated by heating means 28 to be directed to lower disposed duct fingers supported in the base assembly 14 of the oven as will hereinafter be described. The duct tubes 48 include guide rods or fingers 50 which extend therefrom in the downward direction and are curved or bent so as to facilitate coupling with the base portion 14 of the oven as will be more fully described hereinafter.

The duct tubes 48 also include openings 52 which are disposed in the high pressure plenum chamber 34 of the upper hood assembly 12. As seen in FIG. 5, the openings 52 is an angled aperture which allows a maximum flow of heated gaseous cooking medium therethrough from the high pressure plenum chamber 34. The duct tubes are supported in position by means of a positioning detent 60 or by other suitable means so as to extend a predetermined distance below the bottom edge of the upper hood portion for engaging the base assembly 14 as will be hereinafter described.

The upper hood assembly 12 also includes support means 54 and 56 associated a the lift assembly means which allows the upper hood assembly to be selectively raised with respect to the base portion 14 of the oven as previously described. As seen in FIG. 4, the upper support means 54 includes a driven sprocket 55 as well as idler sprockets 58 which are coupled by means of drive chain 59 to motor 57 positioned on top wall 12c of the hood assembly. A second sub-loop of drive chain 59a couples one of the sprockets 58 with the driven sprockets 55 thereby separating the chain tension applied to each of the sprockets 55. Driven sprockets 55 of the upper support means 54 are positioned so as to lie in a horizontal plane such that upon activation of the motor 57, all of the driven sprockets 55 will be positively driven simultaneously without inducing extreme torques or other unwanted forces in the lift system or on the hood assembly. As will be described hereinafter, the drive sprockets 55 are coupled to screw jacks for selectively raising the hood assembly 12 as is desired. Upon activation of the motor 57 a great amount of tension will be supplied to the drive chain, for example, upon the activation of the motor, there may be up to 200 lbs. of chain tension applied to supports 54. It therefore may be desirable to provide further support such as compression members 61 formed into an H-shaped frame to oppose chain tension which are coupled to the upper support means 54. The compression member 61 may be formed as shallow channels which will help to oppose this chain tension and the lift assembly of the invention will enable thermal expansion of the upper hood assembly to occur. In this regard, the H-shaped frame including compression members 61 is not attached to the hood assembly 12 except at a central portion of the oven near motor 57.

Although the support means 54 are coupled to the screw jacks forming part of the lift assembly, the weight of the hood assembly 12 is essentially carried by the lower support means 56 which are mounted at spaced positions at the lower edges of the hood assembly 12. The lower support means 56 forming part of the lift assembly for the hood assembly 12 are constructed as support shoes which extend under the edges of the hood assembly as seen in FIG. 5.

As will be more fully described hereinafter, the lower support shoes 56 act in conjunction with support beams running the length of the upper hood assembly 12 so as to maximize the strength of the hood assembly while enabling thermal expansion thereof. The support shoes 56 include pivoting or rolling means to allow the hood assembly to slide thereon while fully supporting the weight thereof. It should be recognized that upon activation of the motor 57, the driven sprockets 55 on upper supports 54 will rotate simultaneously to enable simultaneous operation of the screw jacks to which the driven sprockets are attached for lifting of the upper hood assembly 12. It is a novel aspect of the invention that the upper hood assembly 12 may be lifted a predetermined amount while remaining in coupling relationship with the lower base portion of the oven. In this way, the upper disposed duct fingers 40 may be selectively positioned at varying heights above the conveyor system 26 on which food products are disposed. Therefore, the upper duct fingers 40 may be positioned so as to optimize the cooking of any particular food product which is being cooked.

In the type of oven which utilizes impingement of a heated gaseous cooking medium onto the surfaces of the food product passing through the oven on a conveyor system, it is recognized that the heat transfer characteristics of the gaseous medium change according to the distance of the duct fingers, which supply the impinging cooking medium, from the food product itself. Thus, the upper disposed duct fingers 40 may be selectively positioned at the optimum height for any particular food product which is to be cooked by raising or lowering the hood to this desired position. By extending the duct tubes 50 substantially below the lower edge of the hood assembly 12, distribution of the heated gaseous cooking medium to the lower disposed duct fingers in the base portion of the oven may be provided at varying heights of the hood assembly 12.

As will be seen more clearly in subsequent figures, the hood assembly 12 also includes blades 62 extending from the lower edge of the hood assembly which coact with water troughs formed on the base portion so as to form a deep water seal allowing the selective height adjustment of the hood assembly 12 while the oven is operational. It is also noted that the moisturizing means 31 may be positioned at various locations within the cooking chamber 36 so as to provide for the incorporation of the desired amount of moisture into the heated gaseous cooking medium.

Turning now to FIGS. 6-13, there are shown more detailed views of the hood assembly construction. In FIG. 6, there is shown a cross-sectional view through the upper hood assembly 12 showing more distinctly the duct tube 48 associated therewith. A dividing wall 38 separates the high pressure plenum chamber 34 from the cooking chamber 36 and includes an apertures for access to the chamber 34 at the location of the duct fingers 40. It is also noted that the side walls 12a and 12b of the oven enclosure include outer skins as well as inner skins 64 and 66, whereby an insulating material may be disposed therebetween to retain heat within the oven for economic and efficient use thereof.

The duct tubes 48 disposed within the high pressure plenum chamber 34 for supplying a heated gaseous cooking medium to the lower disposed duct fingers within the base portion of the oven may include a damping means 70, positioned over the upper opening 52 to force the high pressure cooking medium into a desired distribution for impingement on the food products being cooked. The damping means 70 also allows adjustment of the quantity of heated gaseous cooking medium being directed to either the upper or lower duct fingers respectively. The damping means 70 is adjustable within opening 52 in a range which may extend between 45 degrees and 90 degrees to control the amount of cooking medium entering the duct tubes 48 and its velocity. There may be provided a manual lever 60, as seen in FIG. 5 having a string of holes and a detent coacting with a spring loaded ball bearing to allow manual positioning of damping means 70 over the upper openings 52 in the duct tubes 48.

Alternatively, the adjustment of damping means 70 may be achieved automatically by means of a lever extending to support the damping means 70 which may be driven by a screw jack coupled to a stepper motor for selectively positioning the damping means by electronic control. Depending on the particular food product which is being cooked, a damping means 70 may be positioned for best cooking of that product before or during operation of the oven.

In FIG. 7 there is shown a lengthwise sectional view of the upper hood assembly 12 which more clearly shows the sectional nature of its construction. As is seen in FIG. 7, the upper hood assembly is constructed of a plurality of sections, wherein thermal expansion of the hood assembly will be accommodated by movement of the individual sections while maintaining the strength of the hood assembly as is desired. For example, side wall 12a of the hood assembly may comprise sections 72, 73 and 74 being joined by weld joints 75 and 76 so as to make the side wall somewhat flexible to accommodate thermal expansion during operation of the oven. The offsetting characteristics of flexibility for thermal expansion and strength in the hood assembly has been a significant problem in the construction of such ovens.

For example, during operation of the oven, there may be up to ½ inch of thermal expansion axially along the length of the oven which would necessarily put a great amount of strain on the hood assembly. Separating the hood assembly into a plurality of sections introduces enough flexibility to compensate for this thermal expansion. A novel support structure for the hood assembly to be described later retains sufficient strength to prevent the hood assembly from collapsing.

Also seen in FIG. 7, the duct fingers 40 having slotted apertures 132 therein to provide a sheet of impinging cooking medium to the food products are shown. In some instances, an even distribution of cooking medium through the duct fingers is not achieved for one reason or another. It is desirable to equalize cooking characteristics over the extent of the conveyor belt which may be achieved by varying the geometry of the slots 132 in individual fingers across the belt. The geometry may be varied by changing the width of slots 132 across the belt to achieve even cooking characteristics. For example, if less cooking is achieved near the ends of the oven, the slots 132 may be widened to increase the flow of cooking medium therethrough and increase cooking in the area. In this way, any local variations in cooking within the oven may be compensated for. In FIG. 7, the slots 132 at the end of the oven may be wider than the slots in the duct fingers 40 near the central part of the oven.

As seen more distinctly in FIG. 8, the high pressure plenum chamber 34 having the duct tube 48 disposed therein with upper aperture 52 receiving high pressure cooking medium for distribution to the lower disposed duct fingers is shown. The duct tube 48 includes guide rods or fingers 50 having a substantial length which facilitate proper positioning thereof within the orifice plate of the base portion of the oven as will hereinafter be described.

The guide rods 50 have a substantial length so as to create gaps between the duct tube 48 and orifice plate of the base portion so as to reduce the surface area of duct tube 48 which may tend to attract cooking residue during the cooking process. In order for the duct tubes 48 to freely move in the vertical direction into and out of its operational position with the base portion, it is necessary to prevent the congealing and caking of cooking residue on the duct tubes 48 which could possibly weld the duct tubes to the base portion of the oven. The telescoping function of the duct tube with respect to the base portion of the oven is important for adjustability of the upper disposed duct fingers and optimization of the cooking process.

Also seen in FIG. 8 is the support construction of the walls of the upper hood assembly as shown at 78 and 79. As mentioned previously, it is desirable to allow the upper hood portion a degree of flexibility to accommodate thermal expansion during operation of the oven while retaining sufficient strength to prevent collapse of the hood assembly or other associated problems. The plurality of sections and joints described with relation to FIG. 7 allow sufficient flexibility for thermal expansion but detract from the strength of the overall hood construction.

To reinforce the strength of the upper hood assembly there may be provided support means 78 and 79 which comprise two rectangular beams which run the length of the hood assembly and may be welded at a mid-portion of the oven. The rectangular beams add sufficient reinforcing strength to the hood assembly for long use and durability of the oven. As will be seen with reference to FIG. 18, the lower beam structure 78 acts in conjunction with the lifting means associated with the hood assembly as previously described to maintain the flexibility of the hood assembly for thermal expansion.

The support assembly 78 includes beams 80 and 81 which provide sufficient rigidity and strength to the hood assembly as is desired. The sheet metal making up the outer skin of the side walls 12a and 12b of the hood assembly are formed with channels 82 welded thereto so as to distribute stress over an expansive area of the sheet metal skin of the hood assembly. For example, at every joint in the sheet metal which allows flexibility but also forms an area of weakness in the hood, there may be provided a supporting channel 82 coacting with the beam supports 78 to allow the weight of the hood to be supported by the support beams while enabling axial movement of the hood sections by means of channels 82 which are free to move in the axial direction. As also seen in FIG. 18, the lower shoe support 56 associated with the lifting means of the invention may include a pivot or roller 83 to allow axial movement of the head assembly 12. the shoes 56 will act to hold the support beam structure 78 without inducing undue stress on the hood assembly during the lifting or expansion thereof.

Turning to FIGS. 9 and 10, the enlarged sectional views of the upper hood assembly show more distinctly the position of the upper duct disposed duct fingers, duct tubes as well as the area of the fan means for circulating the heated gaseous cooking medium through the oven. It is noted that these figures also show the central portion of the oven which separates upper disposed duct fingers and duct tubes on either side thereof and houses the fan means 30.

This middle section houses the fan means and blower on the rearward side wall 12b of the hood assembly at a central location thereof. As seen in FIG. 9, the blower cone 32 mounted in this central location is in close proximity to the source of heated gaseous cooking medium generated at heater 28. As mentioned previously, the heated cooking medium is drawn into blower cone 32 by means of the blower or fan 30b as seen in FIG. 2. The heated gaseous cooking medium will then be distributed to the upper and lower disposed duct fingers through high pressure plenum chamber 34 separated from the cooking chamber by dividing wall 38 and dividing wall 123 in the hood and base portions respectively.

In FIG. 10 there is shown more distinctly the positioning of the fan means which is centrally located and supported on the back side wall 12b of the hood assembly at a centrally located aperture in the high pressure plenum chamber 34. A fan means 30b is rotated at a high rate by the motor 30a as shown in FIG. 2 which may, for example, be a 60 Hz. motor to generate very high velocity circulation of the heated gaseous cooking medium within the high pressure plenum chamber 34 for distribution to the upper and lower disposed duct fingers.

The high pressure plenum chamber 34 comprises relatively restrictive air passages for distribution of the high velocity cooking medium to the duct fingers to generate impingement velocities of the cooking medium in a range between 4,500 and 5,500 feet per minute. With velocities of the impinging cooking medium in this range, it has been found with the oven configuration of the invention that cooking times may be reduced by up to 20-30% based upon cooking test data of various food products. For example, in prior art ovens utilizing impingement of a heated gaseous cooking medium, velocities in the range of 4,300 feet per minute have been generated for the expedient cooking of food product. The impingement of the heated gaseous cooking medium allows surface characteristics such as browning, searing and the like to be achieved while cooking food products, but it is always desirable to reduce the dwell time of the food products in the oven when being cooked. A decrease of 20-30% in the dwell time necessary for cooking of various products greatly enhances the capabilities of the food processor and allows more efficient and effective cooking procedures. In the high pressure plenum chamber 34, it may also be desirable to include baffle means for distributing the cooking medium evenly to the upper and lower duct fingers.

Similarly to the side walls of the oven enclosure, the top wall 12c as shown in FIGS. 11-13 is formed in sections which allow thermal expansion thereof when the oven is operational. As seen in FIG. 11, the top wall 12c of the oven enclosure includes various sections 85, 86 and 87 about the central location of the oven housing the fan means.

Additionally the top wall portion includes explosion proof doors 44 for allowing the egress of the cooking medium from the interior of the oven in the event of an explosion or the like, as seen in FIGS. 12 and 13. The top wall construction includes inner and outer skins where insulation may be provided therebetween as previously described. The explosion proof door 44 is sealed onto the top wall portion 12c such as by a rubber gasket type seal or the like. Due to manufacturing tolerances in the weight of the door, it has been found that the double-skin construction may make the explosion proof doors 44 too heavy necessitating eliminating one of the skins as shown in FIG. 12. It is of course recognized that other constructions are possible for the explosion proof door construction to meet the weight limitations while insuring proper insulating characteristics and sealing thereof.

Turning now to FIGS. 14, 15 and 16, the base portion on 14 of the enclosure is shown in more detail. The base portion 14 as seen in FIG. 14 includes lower disposed duct fingers which are spaced in the lengthwise direction underneath the conveyor means 26 upon which food products to be cooked are disposed. The lower base portion 14 is similarly separated into separate chambers by dividing wall 123 which in conjunction with the hood assembly define the cooking chamber 36 and the high pressure plenum chamber 34. It is noted that the high pressure cooking medium from the high pressure plenum chamber 34 of the upper hood assembly may be distributed to the lower duct disposed duct fingers 90 by means of an orifice plate 91 having apertures 92 therein which coact with the duct tubes 48 of the upper hood assembly 12. It is noted that duct fingers 90 may extend through the central portion of the oven to provide cooking across the entire belt.

It is a special feature of the invention that the orifice plates 91 are free to float in a horizontal plane so as to allow self-adjustment thereof with the duct tubes 48 which may be moved in the axial direction of the oven by thermal expansion. It is recognized that the base assembly 14 may be supported on a frame structure 94 as seen in FIG. 16 which is relatively cool as compared to the oven enclosure. The hood assembly 12 is subjected to thermal expansion in the axial direction when the oven is operational requiring self-adjustment of the orifice plates so as not to induce unwanted stress on the hood assemble or duct tubes 48 thereof. Similarly, if the hood assembly 12 is raised from the base assembly 14 when the oven is hot, there may be presented a problem in that some portions of the oven enclosure may cool significantly faster than other portions causing contraction thereof and subsequently misalignment of the duct tubes 48 with the apertures 92 in orifice plates 91. For this reason, floating in the horizontal plane of the orifice plate 91 allows the guide members 50 of the duct tubes 48 to reposition the apertures 92 in orifice plate 91 upon subsequent repositioning of the hood assembly 12 on the base assembly 14.

As mentioned previously, the guide means 50 on the duct tubes 48 are constructed so as to allow the surface area of the tubes in relation to the orifice plate 91 to be reduced. This may also be accomplished by providing notches 94 in the apertures 92 of orifice plate 91 enabling reduction of the guide rod length.

In another aspect of the invention the orifice plate 91 may act as a mechanical fuse wherein, in the event that cooking residue from the food products happens to weld the duct tubes 48 and orifice plates 91 together, the orifice plates 91 are designed to shear upon the application of an amount of force allowing separation of the hood assembly 12 from the base assembly 14 without damaging other components of the oven. For example, cooking residue may congeal around the duct tubes 48 and onto the orifice plate 91 creating 200–300 psi sheer forces which weld the hood assembly 12 to the base assembly 14. If the hood assembly 12 was to be raised with the duct tubes 48 welded to the orifice plates 91 in this manner, it is possible that the entire base assembly 14 of the oven would also be raised in conjunction with the hood assembly 12. Without the mechanical fuse construction of the orifice plate 91, the separation of the hood assembly 12 from the base assembly 14 would necessitate the use of complicated measures as well as time and cost to separate the assemblies and possibly incurring extensive damage to the oven.

The base assembly 14 also includes a deep water trough 96 which acts in conjunction with blades 62 formed on the upper hood assembly 12 to form a water seal around the periphery of the oven except in the area of input 18 and output 20 of the oven. The water trough 96 is necessarily deep to insure continuous sealing during vertical adjustment of the hood assembly 12 from the base assembly 14 by the lifting means associated with the hood. In this way, the operation of the oven is maintained while adjustment of the hood assembly 12 and therefore the upper disposed duct fingers 40 is performed to enable positioning of the upper disposed duct fingers 40 at the location where cooking of any particular food product is optimized.

The base assembly 14 also includes the conveyor means 26 which is an endless pervious conveyor mechanism as shown in FIG. 1. The conveyor system 26 may be supported on one side thereof by support means 97 which extend from the conveyor belt support to a sidewall of the base assembly 14. On the other side of the conveyor belt support, as shown at 98, there may be provided hinges for allowing pivoting of the conveyor belt support for access to the lower disposed duct fingers 90 within the base assembly 14. The pervious conveyor belt of the conveyor system has enough flexibility to allow pivoting of the conveyor support upwardly to a sufficient extent to allow removal of the lower disposed duct fingers 90 for cleaning or maintenance thereof. Similarly, the lower disposed duct fingers 90 may include finger support means 93 which extend from the distil ends of fingers 90 to the upper ledge of front side wall 14a to properly position the duct fingers 90.

As seen in FIG. 15, the base assembly 14 also comprises a water cooled plate 99 which is positioned at an angle in the bottom of the base assembly 14 so as to catch and direct cooking residue or the like continuously to an outlet drain aperture 100 formed in the bottom wall of the base assembly 14. A disposal pipe 102 may be connected to the aperture 104 directing the cooking residue and the like out of the oven and to a catch box 104 as shown in FIG. 1 of a conventional type, adapted to receive the cooking residue and drippings from the food products during the cooking process. The sloping bottom wall surface 99 is seen more distinctly in FIG. 16 for directing such waste to the opening 100 in the bottom wall of the base assembly 14.

Turning now to FIG. 17, the hood assembly 12 and base assembly 14 are shown in their operational position whereby the operation of the oven can be seen more distinctly. As it is shown in FIG. 17, the upper hood assembly 12 includes downwardly extending blades 62 which coact with the water troughs 96 formed in the base assembly 14 to allow a water seal to be formed around essentially the entire periphery of the oven enclosure at the junction of the hood assembly 12 with the base assembly 14. In operation, the upper disposed duct fingers 40 are positioned directly above the conveyor means 26 on which food products to be cooked are to be placed. Similarly, the lower disposed duct fingers 90 are disposed directly underneath the conveyor means 26 for impingement of a heated gaseous cooking medium to both upper and lower surfaces of the food products passing through the oven on the conveyor means 26.

As described previously, the hood assembly 12 includes fan means 30 having a motor 30a drivingly coupled to driveshaft 112, operatively connected to the fan 30b for rotation thereof. The blower cone 32 extends through the dividing wall 38 which separates the high pressure plenum chamber 34 from the cooking chamber 36 so as to define and separate the high pressure side of the fan 114 disposed within plenum chamber 34 and the relatively low pressure or recirculation end of the fan as shown at 116. In operation, the heated gaseous cooking medium generated by the heating means 28 as seen in FIG. 2, disposes the heated cooking medium into the cooking chamber in the vicinity of the blower cone 32. The fan 30b will suck in the heated cooking medium at 116 for subsequent high pressure circulation at the high pressure side 114 of the fan in high pressure plenum chamber 34. Similarly, cooking medium which has already been applied to the food product between the upper and lower disposed duct fingers 40 and 90 respectively, is sucked into the recirculation path as shown by arrow 118. The high velocity heated cooking medium generated at high pressure side 114 of the fan means is directed into the upper disposed duct fingers 40 at position 120 for impingement to the food products thereto. Similarly, the high velocity cooking medium is directed into duct tube 48 which coacts with orifice plate 91 forming part of the base assembly 14. The high velocity cooking medium is thus directed to the lower disposed duct fingers 90 at position 122 by means of duct tube 48 and orifice plate 91 for impingement of the cooking medium to the underside of the conveyor means 26.

As seen in FIG. 17, as long as the blades 62 are disposed in water trough 96 to form the water seal around the periphery of the oven enclosure, the oven can remain operational to provide impingement of the heated gaseous cooking medium onto food products passing through the oven on the conveyor means 26. Thus, the position of the upper disposed duct fingers 40 can be varied in the vertical direction the length of the blades 62 to provide proper placement of the duct fingers 40 for optimum cooking of the particular food product.

In order to accomplish raising of the upper hood assembly 12 there are provided lift assembly means which may comprise screw jacks 110 having support shoes 56 mounted under and supporting the side walls 12a and 12b of hood assembly 12. The support shoes 56 are secured to the screw jacks 110 such that upon operation of the screw jacks the shoes will be lifted and will correspondingly lift the hood assembly 12 to its desired position. The lift means 10 may be operated automatically such as by a micro-adjust controlling means to position the upper disposed duct fingers 40 in the optimum cooking position for a particular food product being passed through the oven, and may be adjusted during a cooking cycle for various food products while the oven is operational. Similarly, the lift means 110 may completely disengage the upper hood assembly 12 from the lower base-assembly 14 for access to the interior surfaces of the oven for cleaning and maintenance thereof. The lift means 110, as will be more fully described in reference to FIGS. 29–31, allows the upper hood assembly 12 to be raised a significant distance up to 3 feet from the base assembly 14 for access to the oven's interior for easy cleaning, as well as removal of the duct fingers for cleaning thereof, or other maintenance operations.

With the oven construction as shown in FIG. 17, it has been found that extremely high velocities of the heated gaseous cooking medium may be obtained for impingement onto the food products by means of upper and lower disposed duct fingers 40 and 90 respectively. The high velocities generated in the oven configuration allow for faster and more effective cooking by reducing the dwell time in the oven to achieve proper cooking of food products by up to 20 to 30%. Additionally, the vertical adjustment of the upper disposed duct fingers 40 allows for optimization of the cooking process during a cooking cycle for various food products, as well as enabling easy and effective cleaning of the interior surfaces of the oven in an efficient manner.

Turning now to FIGS. 19–28, the upper and lower disposed duct fingers 40 and 90 are shown in more detail. As shown in FIGS. 19 and 20, both the upper and lower disposed duct fingers 40 and 90 include a jet plate 130 facilitating impingement of the heated gaseous cooking medium onto a food product. The jet plate 13 consists of an apertured plate member with apertures 132 comprising slots disposed along the lengthwise edges thereof. Due to manufacturing tolerances, it may be necessary to include unbroken sections 133 in the slots 132 although optimally it would be desired to exclude these. Each of the apertures 132 in the jet plate 130 is formed as a L-shaped slot formed on the lower edges of the jet plate 130. As seen in FIG. 24, a portion of the slots 132 extends along the bottom of jet plate 130, as well as extending along the longitudinal side walls 134 of the jet plate 130 as seen in FIG. 20. In this way, the side walls 134 of the duct fingers act to direct the high velocity cooking medium out of the slots 132 and in an essentially vertical sheet or curtain of the cooking medium for impingement on the food product. The width of the slot through which cooking medium will pass is found to be optimum at about ⅛ inch but goods results are achieved with slots up to ¼ inch in width. As mentioned previously, the slots 132 may also be constructed to be wider to let a greater flow of cooking medium therethrough for even cooking. It is also noted that the jet plates 130 may accommodate a collimating plate (not shown) which may comprise a plate have circular apertures therein for directing the flow of cooking medium in a perpendicular direction to the collimating plate. The use of a collimating plate would induce a pressure drop thereby reducing the velocity of the impinging cooking medium, and it may be preferable to exclude the collimating plate to achieve the maximum velocity of the impinging medium. It is also recognized that other aperture geometries may be utilized with the duct fingers to provide impingement of cooking medium to the food product.

As seen in FIGS. 21 to 24, the lower disposed duct finger 90 comprises generally a fabricated sheet metal member having generally triangular shaped side walls 136, a generally sloping bottom wall 140, and a generally vertical end wall 142 with the top of the duct finger being open as at 144 and also being open at the right hand end 146 thereof.

The sloping bottom wall 140 preferably has opening 148 (FIG. 22) formed therein for permitting drippings falling down from the conveyor means 26 into the chamber defined by the duct finger 90, to flow out of the duct finger onto the sloping bottom wall surface 99 as shown in FIG. 17, for example.

The side walls 136 of the lower disposed duct fingers 90 preferably has headed pins 150 projecting outwardly therefrom which are adapted for receiving the jet plate 130 and securing it in the lower end 144 thereof. The top of the rearward end portion of each duct finger 90 is preferably provided with a hook shaped member 152 adapted for coacting and retaining a jet plate 130 therein. The duct finger 90 is adapted to be removably mounted on a supporting vertical wall such as dividing wall 123 by means of hook members 154 so as to hang the duct finger 90 in the desired position below the conveyor means 26. The duct finger 90 is positioned on the dividing wall 123 in coacting relationship with apertures or duct work formed in the dividing wall 123 for furnishing the heated cooking medium from the duct tube 48 into the duct finger 90 and upwardly through the associated jet plate 130 to impinge upon the under side of the conveyor means 26 for cooking food products thereon.

Referring now to FIGS. 25–28, the upper disposed duct finger 40 shown in more detail and is of a similar construction to that of the lower disposed duct finger 90. The duct finger 40 comprises a fabricated sheet metal member preferably made by stainless steel and having generally triangular shaped side walls 160, a sloping top wall 162, and generally vertical outer end wall 164 as well as open bottom and back walls 166 and 168 respectively. The jet plate 130 is adapted to be received in the bottom open end 166 of duct finger 40 and is retained therein by a key lock mechanism similar to that of the lower disposed duct finger 90. The duct finger 40 includes hook shaped members 170 adapted to releasably secure the duct finger 40 onto the dividing wall 38 over duct work in the dividing wall such that the upper disposed duct finger 40 will receive heated air from the pressure side 114 of the fan 30b and high pressure plenum chamber 34 as shown in FIG. 17.

It is noted that both the upper and lower disposed duct fingers 40 and 90 respectively are constructed so as to be releasably secured in there respective positions above and below the conveyor means 26 of the oven. The duct fingers may be easily removed when desired for thorough cleaning thereof as well as giving generally greater access to the interior surfaces of the oven for cleaning purposes. It is also a feature of the invention to provide various positions for the lower disposed duct fingers 90 so that they may be positioned at varying heights away from conveyor means 26 for optimum cooking of particular food products. Although the lower duct fingers 90 are not able to be repositioned during a cooking cycle, and repositioning thereof is somewhat inconvenient, desired positions for certain food products are still able to be provided for optimum cooking in conjunction with the selectively adjustable upper disposed duct fingers 40 movable with the hood assembly 12.

Turning now to FIGS. 29-31, the lifting means 110 of the invention comprising a screw jack associated with the hood assembly 12 of the oven is shown in more detail. The lift assembly 110 includes upper and lower support shoes 54 and 56 as previously described wherein support shoe 56 coacts with support means running the length of the hood member 12 and essentially supports the weight of the hood thereon. The lift assembly 110 further includes a power screw means 180 which extends in the vertical direction from lift assembly 110 and may be provided with a driven sprocket 55 (shown in FIGS. 4 and 5) thereon for coupling to a positive timing driving system.

The lift assembly 110 further comprises outer and inner tubes 182 and 184 respectively which are adapted to adjust in a telescopic manner upon rotational movement of the power screw 180. A flange member 186 coacts with the power screw 180 as well as bumper tube 188 and a guide tube 189 so as to selectively move outer tube 182 relative to inner tube 184 upon activation of a drive means. The power screw 180 is supported for rotational movement within a bearing sleeve 181 and bearing plate 182 supported at upper support 54 of lift assembly 110. There may also be provided a lower disposed support shoe 190 for supporting the base assembly 14 of the oven enclosure.

It should be recognized that the screw jacks 110 and driving means as described with reference to FIG. 4 provides a supporting exoskeleton type of arrangement which enables proper support and lifting capabilities while allowing thermal expansion of the oven to occur. Upon activation of the drive motor 57, a drive chain 59 acting on drive sprockets associated with power screw 180 will act to simultaneously rotate the screw jacks 110 for vertical movement of the hood 12. The drive sprockets 55 associated with the power screw 180 are positioned in a coplanar manner such that upon activation of the motor 57 a positive timing relationship simultaneously rotate each of the drive sprockets 55 on the respective power jacks of the lift assembly 110. Thus, at the location of each screw jack of the lift assembly, the hood assembly 12 will be selectively raised or lowered simultaneously to the desired height for operation or cleaning of the oven.

In the embodiment of the oven as disclosed herein, it is found that extremely high velocity of the impinging cooking medium can be obtained within the range of 4500 to 5500 feet per minute. In the preferred embodiment, the temperature of the heated medium may fall within the range of 200° F. to 700° F. and usually operation of the oven occurs within the range of 450° F. to 500° F. By the increase of velocity of the impinging cooking medium, the dwell time necessary to provide the proper cooking characteristics to any particular food product may be reduced by up to 20 to 30% over prior art ovens. Typical cooking times may vary from nominal cooking times to 20 to 30 minutes depending upon the particular food product. The linear velocity of the conveyor means 26 disposed between the upper and lower disposed duct fingers in the oven construction is thus selected for the desired dwell time of the particular food product to provide the desired cooking characteristics thereof. Similarly, the temperature and incorporation of moisture into the heated cooking medium is selected to provide the desired characteristics to the cooked food product.

It should be recognized that the construction of the oven as disclosed herein expands the abilities of the food processor to cook mass quantities of food products in an extremely efficient and effective manner. By allowing the duct fingers to be selectively positioned for optimum cooking of any particular food product, the food processor may cook various food products within the same cooking cycle while optimizing the cooking process. Similarly, the impingement of the heated cooking medium allows for various surface characteristics such as browning and the like to be achieved while optimizing the full or partial cooking of a food product within the oven. The oven construction also allows easy and effective cleaning of the interior surfaces thereof without being extremely time consuming or inconvenient.

The adjustable cooking oven of the invention allows a great amount of flexibility to the food processor to enable mass quantities of food products to be quickly and efficiently cooked with the desired characteristics. Although the present invention has been defined in terms of a simplified illustrative example and preferred particular embodiments of its construction and method of cooking, it is contemplated that all alterations and modifications may be made without departing from the scope of the invention as defined in the appended claims.

What is claimed is:

1. A food cooking oven comprising an upper hood means and base means which are separable from one another and define a substantially closed vapor leak proof enclosure except for an inlet and outlet in said enclosure, wherein said hood means comprises side walls, end walls, and a top wall, and said base means comprises side walls, end walls and a bottom wall, said enclosure defining a cooking chamber for receiving food product therein, means for conveying food product through said chamber from said inlet and exiting through said outlet, heater means extending through a wall of said cooking chamber for heating a gaseous medium, suction fan means on a wall of said cooking chamber in relatively closely spaced relation from an outlet of said heater means, a source of moisture disposed in relatively closely spaced relation to said outlet of said heater means for mixing moisture with said gaseous medium from said heater means, means disposed above and below said conveying means for directing said gaseous medium to opposite sides of said conveying means for impingement onto and cooking of food products thereon, a second chamber separate from said cooking chamber and in communication with the pressure side of said fan means for directing the mixture of gaseous medium and moisture to said means disposed above and below said conveying means for impingement of said gaseous medium onto said food products, wherein at least certain ones of said means disposed above and below said conveying means are adapted to be selectively movable relative to said conveying means during operation of said oven so as to vary the cooking characteristics of the oven.

2. An oven in accordance with claim 1, wherein, said means disposed above and below said conveying means for said directing said gaseous medium to opposite sides of said conveying means comprises a plurality of generally horizontally spaced duct fingers disposed in said cooking chamber and communicating with said second chamber by duct means.

3. An oven in accordance with claim 2, wherein, said duct fingers are located on a vertical dividing wall means which acts to separate said cooking chamber from said second chamber.

4. An oven in accordance with claim 2, wherein, said duct fingers include a chamber having at one side thereof a jet plate comprising slots formed therein for directing said gaseous medium out of said chamber as a sheet of gaseous medium which will impinge upon said food products for cooking thereof.

5. An oven in accordance with claim 4, wherein, said slots in said jet plate having with in the range between 1-8 inch and ¼ inch.

6. An oven in accordance with claim 4, wherein, said slots in said jet plate have a width which may be varied along the length of said oven in individual ones of said duct fingers so as to equalize cooking of said food products throughout the extent of said oven.

7. An oven in accordance with claim 1, wherein, said hood means includes a lifting means adapted to support said hood means at a lower edge thereof and able to selectively raise or lower said hood means in relation to said base means.

8. An oven in accordance with claim 7, wherein, said lifting means allows said hood means as well as said means disposed above said conveying means for directing said gaseous medium onto said conveying means for impingement onto and cooking of food products thereon, to be adjusted in essentially the vertical direction for optimization of the cooking process during operation of said oven.

9. An oven in accordance with claim 7, wherein, said lifting means allows said hood means to be fully disengaged from said base means for access to the interior surfaces of said oven to facilitate cleaning and maintenance operations 10. An oven in accordance with claim 7, wherein, said lifting means includes a plurality of screw jacks positioned around the periphery of said hood means, each having a driven sprocket associated therewith which is operatively coupled to a driving means for simultaneous rotation of each of said driven sprockets for operation of said screw jacks.

11. An oven in accordance with claim 10, wherein, each of said driven sprockets on said screw jacks is coupled to said driving means by drive chain means, and support means are provided between said driving means and said driven sprockets so as to oppose drive chain tension during operation of said drive means.

12. An oven in accordance with claim 11, wherein, said driven sprockets are coupled to said drive means by means of a sub-loop of drive chain so as to separate drive chain tension to each of the drive sprockets, wherein said sub-loop of drive chain is coupled to a drive idler sprocket which itself is driven by said drive means.

13. An oven in accordance with claim 1, wherein, said hood means includes blade means extending below the bottom edge of said hood means for operationally connecting to said base means to provide said substantially closed vapor leak proof enclosure at various elevations of said hood means.

14. An oven in accordance with claim 13, wherein, said blade means coacts with a deep water trough formed on said base means so as to provide a water seal around the periphery of said enclosure to allow vertical displacement of said hood means while maintaining said water seal.

15. An oven in accordance with claim 1, wherein, said hood means includes duct tube means extending below the bottom edge of said hood means to act in conjunction with orifice means in said base means to direct said gaseous medium from said second chamber to said means disposed below said conveying means for directing said gaseous medium onto the bottom side of said conveying means for impingement onto and cooking of food products thereon.

16. An oven in accordance with claim 15, wherein, said duct tube means is telescopically coupled to said orifice means in said base means so as to direct said gaseous medium to said means disposed below said conveying means at various elevations of said hood means.

17. An oven in accordance with claim 15, wherein, said orifice means comprises a plate which is movable in a horizontal plane to provide self-adjusting of the position of said plate in conjunction with the position of said duct tube means in said hood means.

18. An oven in accordance with claim 15, wherein, said duct tube means includes damping means in co-acting relationship with said second chamber for selectively adjusting the amount of flow of cooking medium from said second chamber to said means disposed below said conveying means for directing said gaseous medium onto said conveying means.

19. An oven in accordance with claim 15, wherein, said duct tube means include guide means to act on said orifice means of said base means to facilitate the self-adjustment of said orifice means to coact with said duct tube means.

20. An oven in accordance with claim 19, wherein, said guide means comprises rods having the substantial length so as to reduce the surface area contacting said orifice plate means to prevent congealing of cooking residue at the junction of said duct tube means and said orifice means.

21. An oven in accordance with claim 15, wherein, said orifice means includes apertures being of generally circular shape and having notches formed at discrete intervals therearound so as to reduce the surface area of said orifice plate means which contacts said duct tube means so as to prevent congealing of a cooking residue at the junction of said orifice means and said duct tube means.

22. An oven in accordance with claim 1, wherein, said hood means includes a plurality of support beams positioned at a lower edge of said side walls of said hood means which are movably coupled to channel means secured on said side walls to provide support for said hood means while allowing axial movement thereof.

23. An oven in accordance with claim 22, wherein, said hood means includes a lifting means for displacing said hood means in a vertical direction, wherein said lifting means is movably coupled to said support beams to thereby support said hood means and enable vertical and axial movement thereof.

24. An oven in accordance with claim 1, wherein, the interior of said oven is comprised of stainless steel.

25. A method of cooking food products in an oven including a substantially closed vapor leak proof elongated enclosure having an inlet and outlet in opposite end walls of the enclosure, and including conveyor means for conveying food product through the cooking chamber in said enclosure from said inlet and exiting through said outlet, wherein said enclosure includes separable hood means and base means, comprising providing a source of gaseous cooking medium and directing it into said cooking chamber, applying moisture to said cooking medium closely adjacent to said source of gaseous cooking medium and then sucking by fan means the moisturized cooking medium from said cooking chamber into another chamber separate from but adjacent to said cooking chamber, then forcing the moisturized cooking medium via said other chamber to means disposed above and below said conveying means for directing said gaseous medium toward the respective confronting surfaces of said conveyor means to cause impingement of said gaseous cooking medium on the food product, and then recirculating said cooking medium from said cooking chamber back into said other chamber via said fan means, and providing for adjustment of the elevation of at least certain of said means disposed above and below said conveying means during operation of said oven whereby the cooking characteristics of the oven may be varied and the cooking operation may be optimized.

26. A method in accordance with claim 25, including adjusting the elevation of said hood means in relation to said base means to provide for said adjustment of the elevation of said means disposed above said conveying means for directing said gaseous medium toward the upper confronting surface of said conveyor means.

27. A method in accordance with claim 25, wherein, said forcing of said moisturized cooking medium is provided to duct finger members disposed above and below said conveyor means for producing a high velocity sheet of cooking medium impinging upon said food product adapted to be moved through said oven on said conveyor means.

* * * * *